(12) United States Patent
Liu

(10) Patent No.: US 10,999,608 B2
(45) Date of Patent: May 4, 2021

(54) INTERACTIVE ONLINE ENTERTAINMENT SYSTEM AND METHOD FOR ADDING FACE EFFECTS TO LIVE VIDEO

(71) Applicant: Danxiao Information Technology Ltd., Guangdong (CN)

(72) Inventor: Dan Liu, Guangzhou (CN)

(73) Assignee: Danxiao Information Technology Ltd., Guangdong (CN)

( * ) Notice: Subject to any disclaimer, the term of this patent is extended or adjusted under 35 U.S.C. 154(b) by 97 days.

(21) Appl. No.: 16/369,143

(22) Filed: Mar. 29, 2019

(65) Prior Publication Data

US 2020/0314464 A1    Oct. 1, 2020

(51) Int. Cl.
| | |
|---|---|
| *H04N 21/234* | (2011.01) |
| *G06K 9/00* | (2006.01) |
| *H04N 21/472* | (2011.01) |
| *G06T 11/00* | (2006.01) |
| *H04N 21/81* | (2011.01) |
| *H04N 21/2187* | (2011.01) |

(52) U.S. Cl.
CPC ... *H04N 21/23412* (2013.01); *G06K 9/00369* (2013.01); *G06T 11/00* (2013.01); *H04N 21/2187* (2013.01); *H04N 21/47205* (2013.01); *H04N 21/8146* (2013.01)

(58) Field of Classification Search
None
See application file for complete search history.

(56) References Cited

U.S. PATENT DOCUMENTS

| | | | | |
|---|---|---|---|---|
| 6,368,268 B1* | 4/2002 | Sandvick | ............... | A61H 19/44 600/38 |
| 8,608,644 B1* | 12/2013 | Davig | ....................... | A61F 5/00 600/38 |
| 2004/0082831 A1* | 4/2004 | Kobashikawa | ........ | A61H 19/44 600/38 |
| 2005/0014560 A1* | 1/2005 | Blumenthal | ............ | G06F 3/016 463/36 |
| 2005/0204287 A1* | 9/2005 | Wang | ............... | H04N 21/47205 715/716 |
| 2007/0197296 A1* | 8/2007 | Lee | .......................... | A63F 13/63 463/42 |

(Continued)

FOREIGN PATENT DOCUMENTS

CN    108418890 A  *  8/2018  ............. H04L 67/06

*Primary Examiner* — James R Marandi
(74) *Attorney, Agent, or Firm* — Ellenoff Grossman & Schole LLP; James M. Smedley; Alex Korona

(57)  ABSTRACT

A system and method for providing an online broadcast platform that adds a face effect to a live video may be disclosed herein. The system may include a device wirelessly connected to at least one adult toy, wherein the device includes a processor to actuate the at least one adult toy, a buffer storage, wherein the buffer storage stores at least one face effect, and an image recognition module, wherein the image recognition module recognizes a face of a model, wherein the processor includes an installed software application. The method may include receiving a tip from a user to activate a face effect, recognizing a face of a model, retrieving a face effect, combining the retrieved face effect with the face of the model, and broadcasting a video to the user with the retrieved face effect on the face of the model.

17 Claims, 8 Drawing Sheets

(56) References Cited

U.S. PATENT DOCUMENTS

| | | | |
|---|---|---|---|
| 2013/0116502 A1* | 5/2013 | Cambridge | G06Q 20/24 |
| | | | 600/38 |
| 2013/0215116 A1* | 8/2013 | Siddique | G06Q 20/204 |
| | | | 345/420 |
| 2014/0178049 A1* | 6/2014 | Kihara | H04N 9/8211 |
| | | | 386/280 |
| 2015/0328082 A1* | 11/2015 | Jiang | A61H 19/44 |
| | | | 600/38 |
| 2016/0260262 A1* | 9/2016 | Baker | G06F 3/011 |

* cited by examiner

INTERACTIVE ONLINE ENTERTAINMENT SYSTEM AND METHOD FOR ADDING FACE EFFECTS TO LIVE VIDEO

FIELD OF INVENTION

This application is in the field of adult entertainment.

BACKGROUND

The use of video capture devices, for example, webcams, has grown rapidly over the years, especially in the adult video industry. Generally online broadcasts of adult videos may include a model performing some kind of sex act, for example, using an adult toy.

Face effects and filters on images have also rapidly grown in recent years. Everyone wants to add some sort of filter to the pictures or videos to provide additional content.

Thus, there is a need to provide a mechanism to convey face effects in live videos.

SUMMARY

A system and method for providing an online broadcast platform that adds a face effect to a live video may be disclosed herein. The system may include a device wirelessly connected to at least one adult toy, wherein the device includes a processor to actuate the at least one adult toy, a buffer storage, wherein the buffer storage stores at least one face effect, and an image recognition module, wherein the image recognition module recognizes a face of a model, wherein the processor includes an installed software application. The method may include receiving a tip from a user to activate a face effect, recognizing a face of a model, retrieving a face effect, combining the retrieved face effect with the face of the model, and broadcasting a video to the user with the retrieved face effect on the face of the model.

BRIEF DESCRIPTION OF THE DRAWINGS

A more detailed understanding may be had from the following description, given by way of example in conjunction with the accompanying drawings wherein.

DETAILED DESCRIPTION OF THE DRAWINGS

Figure 1:
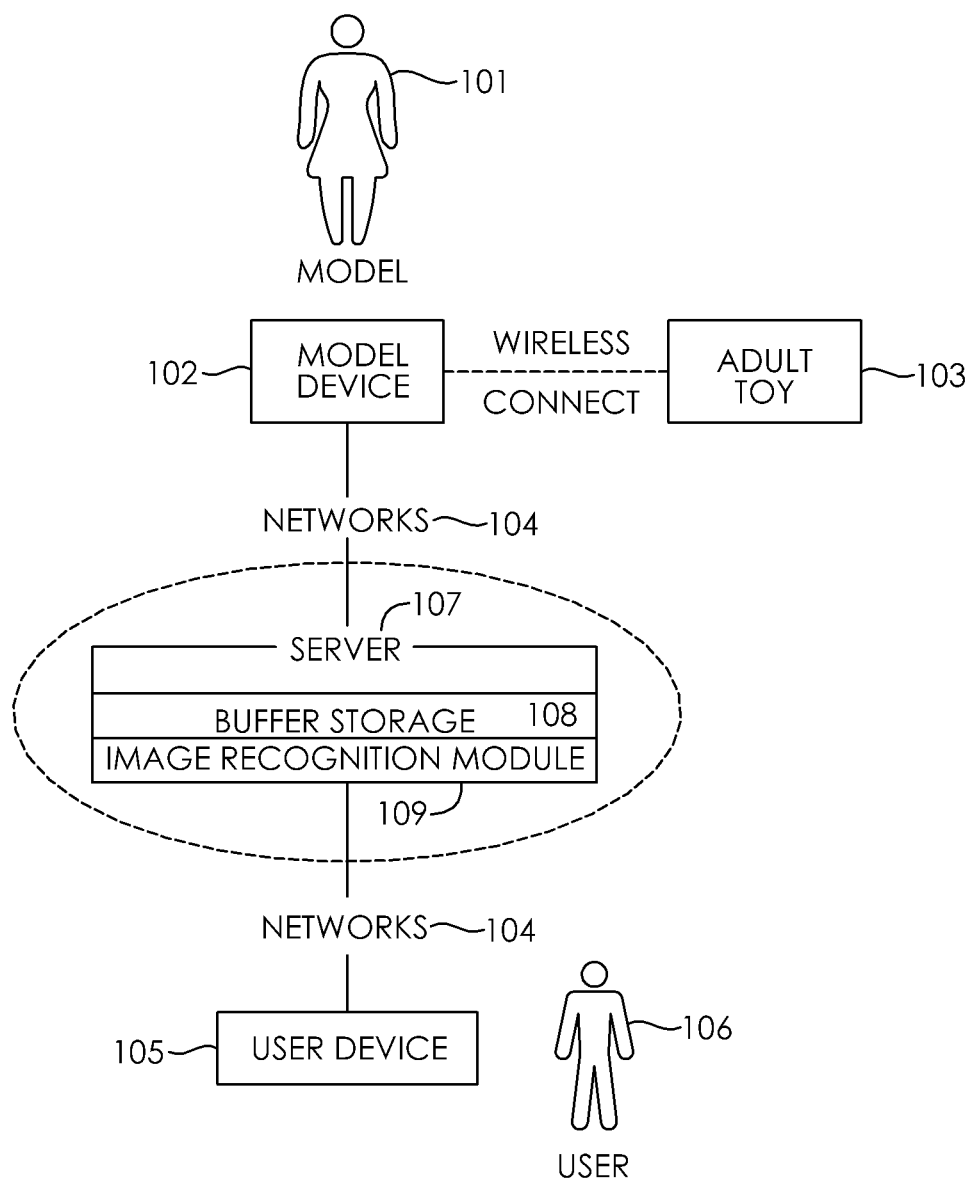
FIG. 1 is an example block diagram of the system for an online broadcast platform that adds face effects into live video.

In the description above, the detailed description, the claims below, and in the accompanying drawings, references is made to particular features (including method steps) of the various embodiments of the invention. It is to be understood that the disclosure of the invention in this specification includes all possible combinations of such particular features, for example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The embodiments of the present invention can be implemented in a variety of ways, such as a process, an apparatus, a system, a composition of matter, a computer readable medium (for example, a computer readable storage medium), or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention may be described in connection with such embodiments, but the invention is not limited to any particular embodiment or any particular set of such embodiments. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method for an online broadcast platform that adds face effects (an example of an effect image) to live video may be disclosed herein. A system described herein may include a server with buffer storage and an image recognition module, wherein the buffer storage may store pictures with face effects, a model, who's an image of the model's body may be recognized by the server (for example, an image of the model's body may be recognized by an image recognition module, which may be a component of the server), a user who may transmit a certain tip to cause the server to add a face effect to a live video, an adult toy (an image of the adult toy may be recognized by the server, for example, by an image recognition module, which may be a component of the server), and a wire-less device connected to the adult toy, for example, a cell phone or the like. The device may include a processor to actuate the adult toy, wherein the processor includes an installed software application. The pictures with face effect may also include the adult toy, meaning the face effect may be related to the adult toy.

At the beginning of a broadcast, a model may define pictures with face effects, for example, rabbit ears, a dog nose, a comfortable face, exciting face, or the like, all of which may be related to the action of the adult toy. Every face effect may be associated with a certain amount of tips, meaning if a customer (or user) transmits a specific amount of tips to a model, the related face effect may be added to the model's body (for example, to the face or another part of the model's body) during a broadcast. When the adult toy is vibrating, several kinds of face effects may be showed on the model's body with a certain sequence. For example, rabbit ears may be shown on the model's head, meaning a lovely scenario at the beginning part of the adult toy's vibration; an excited face may be shown on the model's face, meaning the model is excited by the adult toy at the middle part of the adult toy's vibration; and a comfortable face may be shown on the model's face, meaning the model has gotten a sense of comfort with the adult toy at the end of the adult toy's vibration.

In an exemplary embodiment, when a user transmits a certain amount of tips to the model, the face effect associated with the certain amount of tips may be shown on the live video. The amount of tips related to certain face effect may be defined by the model in a web broadcast platform scenario. The model may set up the same amount of tips on several different kinds of face effects (for example, the amount of tips on the rabbit ears may be 5 tips, and the amount of tips on the dog nose may also be 5 tips). A customer (or user) may choose a certain kind of face effect (for example, the rabbit ears), resulting in a certain amount of tips, related to the chosen face effect, waiting to be paid. After payment is completed, the chosen face effect may be added to the model's body (for example, a rabbit ears may be added to the model's head).

In an exemplary embodiment, the adult toy may be Wi-Fi or Bluetooth enabled. The adult toy may connect to devices through one or more communication interfaces (for example, Wi-Fi or Bluetooth). Such devices may include, but are not limited to, personal computers, smart phones, laptops, mobile computing devices, tablet PCs, touch boards, and the like.

In an exemplary embodiment, the software application may include a link generator for generating a live control link. The live control link may include a unique Uniform Resource Locator (URL).

In an exemplary embodiment, the link generator may be configured to invalidate a previously generated live control link.

In an exemplary embodiment, the link generator may be configured to build a queue of multiple links.

A method described herein may include first defining face effects, for example, rabbit ears, a dog nose, a comfortable face, or an exciting face, depending on the amount of tips. The model may then perform on the broadcast platform without any face effect from the beginning. On a condition that there is a tip action for a face effect, a server may look up the face effect in the buffer storage and combine the face effect with the model's face. On a condition that the face effect is related to an adult toy, the model may act the adult toy related to the face effect. The model may perform on the broadcast platform with face effect. On a condition that the time of the session is running out, the model may perform on the broadcast platform without any face effect and then the session may end. On a condition that the time of the session is not running out, the model may continue to perform on the broadcast platform with the face effect until time runs out. On a condition that there is no tip action for a face effect, the model may perform on the broadcast platform without any face effect. The session may then end. On a condition that there is no face effect related to an adult toy, the model may perform on the broadcast platform with the face effect.

On the broadcast platform, a customer (or user) may choose a face effect associated with a certain amount of tips on a user's device (for example, a computer, smart phones, laptops, mobile computing devices, tablet PCs, touch boards, and the like). The customer may then pay the certain amount of tips associated with the chosen face effect. After payment, the payment information may be transmitted to a server via the network. Once the payment information is received, the server may transmit a command to actuate the chosen face effect on the video (or pictures) of the model's body. Video with the chosen face effect may be in the server or model's computer (Said model's computer may be replaced by smart phones, laptops, mobile computing devices, tablet PCs, touch boards). On a condition that the chosen face effect is associated with an adult toy, the chosen face effect and the adult toy may be actuated simultaneously.

In general, the system and methods described herein may be employed by a user of a computing device connected to a network. Similarly, some steps of the methods described herein may be performed by components and modules of the server while such components/modules are online. In an exemplary embodiment, some of the applications may not be accessible when not connected to a network, however, a user or a module/component of the system itself may be able to compose data offline that may be consumed by the system or its other components when the user/offline system component or module is later connected to the system network.

FIG. 1 is an example block diagram of the system for an online broadcast platform that adds face effects into live video.

As illustrated in FIG. 1, the model 101 may have a device 102 (or model's device) that is wirelessly connected to an adult toy 103, which may be operated and/or utilized by a user or model. The device 102 may receive, transmit, and/or exchange data, (for example, a user may choose face effect data or data of user's payment with tips) and image/video data with the adult toy 103. The device may be any suitable device for interfacing with other components of the entire system, for example, a computer device or user interface. For example, the device 102 may be any suitable interface for receiving input and/or providing output (for example, image/video data) to the model and/or server subsystem. The device 102 may be, for example, a touch screen device (for example, a smart phone, a tablet, a smart board, and/or any suitable computer device), a computer keyboard and monitor (for example, a desktop or a laptop), an audio-based device for entering input and/or receiving output via sound, a tactile-based device for entering input and/or receiving output based on touch or feel, a dedicated user interface designed to work specifically with other components of the entire system, and/or any other suitable user interface (including components and/or configured to work with components of the entire system). For example, the device 102 may include a touch screen device of a smart phone or handheld tablet. For example, the device 102 may include a display (for example, a computing device display, a touch screen display, and/or any other suitable type of display) that may provide output, image data, and/or any other desired output or input prompt to a user. For example, the exemplary display may include a graphical user interface to facilitate entry of input by a user and/or receiving output, such as an image with special face effect.

The adult toy 103 (an accessory that may be operated and/or utilized by a user or model) may be any suitable accessory for use by the model 101 (for example, when model the 101 is imaged during a broadcast session). For example, the adult toy 103 may be a prop that is used by the model 101 while the model 101 is on broadcast session (for example, a video or pictures of the model 101 may be recorded and/or transmitted in real-time to be viewed by a user of the user subsystem as described below). For example, the adult toy 103 may be a device used for erotic stimulation (for example, a sex aid or a "sex toy"). In at least some exemplary embodiments, the adult toy may 103 be a massaging apparatus for human genitalia (for example, a vibrator). For example, the adult toy 103 may be any suitable device for use in recorded video or pictures (by a camera), for example, an erotic video or erotic pictures. In at least some exemplary embodiments, the adult toy 103 may be a tool or other indicator that may be used in video or pictures recorded by a camera. For example, the model 101 may be an erotic model using adult toy that may be an erotic device, a technician or laborer using the adult toy 103 that may be a tool or work device specific to a desired application, an agent using the adult toy 103 that may be a surveillance tool, and/or any other desired role using any suitable adult toy 103. The adult toy 103 may be in communication with the device 102. For example, the adult toy 103 may be in wireless communication (via cord or other connection) to exchange data with the device 102 based on an operation of the entire system. The adult toy 103 may also be in communication with any other suitable component of the entire system, for example components of the server subsystem and/or user subsystem which may transmit data to and/or receive data from the adult toy 103 to control operation of the adult toy 103.

As illustrated in FIG. 1, a server subsystem may include components similar to the exemplary computing device and network components. For example, the server subsystem may include one or more modules having computer-executable code stored in non-volatile memory. The server subsystem may also include a processor for processing data associated with the entire system, as disclosed herein, that may be partially or substantially entirely integrated into any component (or combination of components) of the entire system. For example, the server subsystem may include an image recognition module 109, and a buffer storage 108. The image recognition module 109 and buffer storage 108 may operate in conjunction with the other components of the server subsystem, the model subsystem, and the user subsystem as described herein.

The entire system may transmit image data recorded by camera to the image recognition module 109, which may be real-time or near real-time data relative to the time of processing performed by the image recognition module 109. The data may also be previously-recorded data by the camera. The image recognition module 109 may include components for finding face effects and/or features and combining face effects with pictures/video of the model's body. For example, the image recognition module 109 may include optical tracking components that may perform feature detection and matching to allow for matching and comparison of features imaged by the camera. For example, the image recognition module 109 may include components configured to find predetermined face effects and/or features that may correspond to image/video of the model's body. For example, the image recognition module 109 may include components configured to use any suitable technique to identify features of a viewed object (for example, features of the adult toy 103) and to combine those imaged features to predetermined features provided by the entire system. For example, the image recognition module 109 may identify predetermined features of the model 101, such as body features. Also for example, the image recognition module 109 may include components configured to perform optical character recognition of text and/or markings located on a certain face effect (for example, on the model 101 and/or the adult toy 103). For example, the image recognition module 109 may include any suitable components configured to determine face effect and/or other data that may be matched to predetermined data provided by the entire system (for example, predetermined shapes, colors, text, contours, and the like). For example, the face effect data and/or other data may include data defining points (or contours) of the model 101 and/or the adult toy 103 based on an actual image of an object imaged by a camera.

Buffer storage 108 may include components similar to the exemplary computing device and network components. For example, buffer storage 108 may include components similar to the exemplary storage medium and Random Access Memory (RAM). Buffer storage 108 may be implemented in software and/or a fixed memory location in hardware. Buffer storage 108 (for example, a data buffer) may store data temporarily during an operation of server subsystem. For example, the buffer storage 108 may be used to temporarily store data as it is moved between the image recognition module 109 and pictures/video of the model's body.

The components may be directly connected (for example, by wire, cable, USB connection, and/or any other suitable electro-mechanical connection) to each other and/or connected via a network (for example, via Ethernet LAN). The entire system may also include communication components that may be any suitable devices for communicating data between the various components of the entire system either directly or via network communication. A network 104 may connect the model 101 to a user 106 via the user's device 105. The network 104 may include a server 107 with buffer storage 108 and an image recognition module 109. The buffer storage 108 may store pictures with face effects, for example, rabbit ears, a dog nose, a comfortable face, an excited face, and the like. The image recognition module 109 may recognize pictures/video of the model 101.

Figure 2:
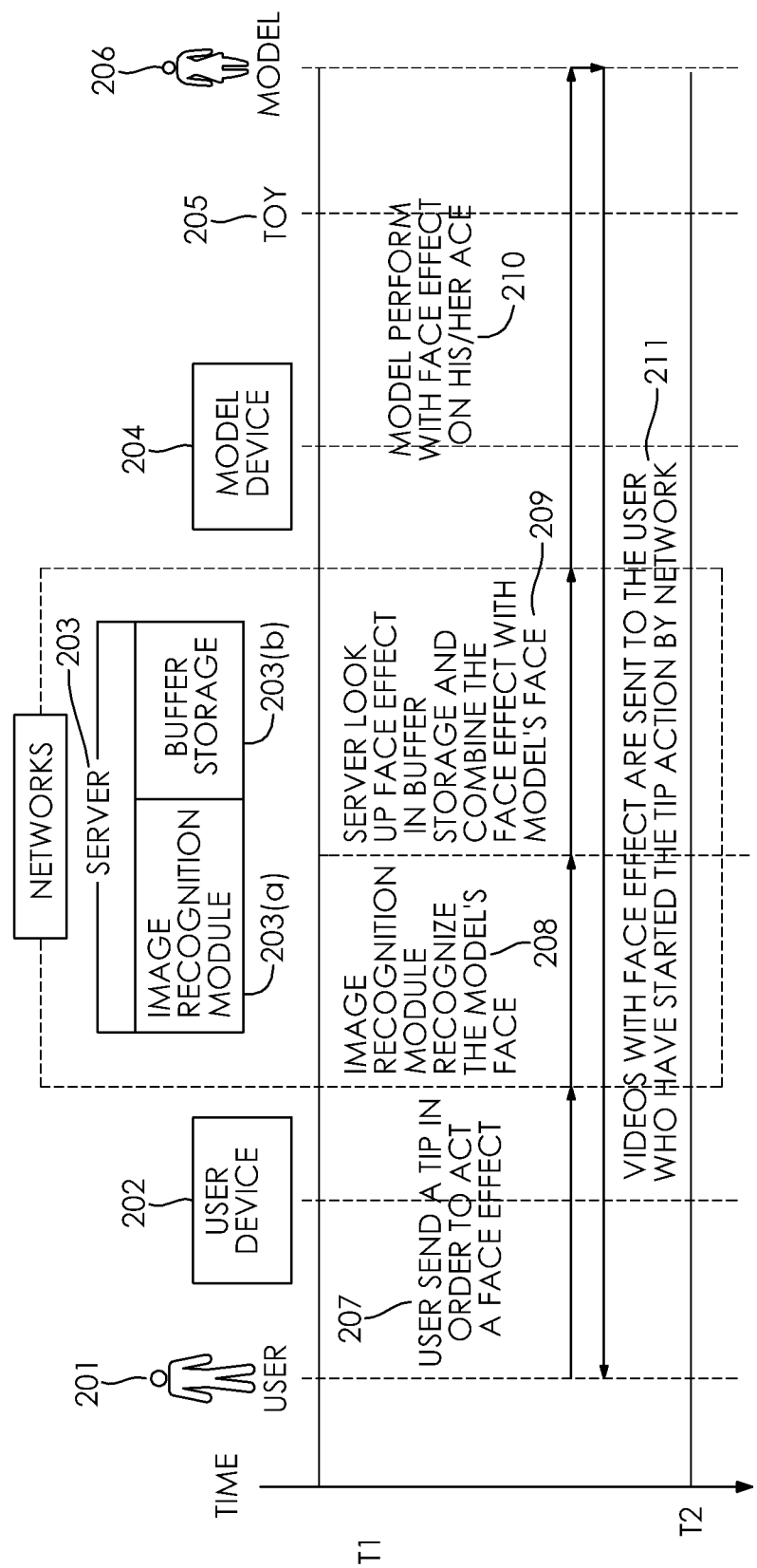
FIG. 2 is an example flow diagram of the method for an online broadcast platform that adds face effects into live video.

FIG. 2 is an example flow diagram of the method for an online broadcast platform that adds face effects into live video. The method may include a user 201, a user device 202, network server 203 including an image recognition module 203a and buffer storage 203b, a model device 204, an adult toy 205, and a model 206. A user 201 may send a tip to a network server 203 via a user device 202 to activate a face effect 207. The image recognition module 203a may recognize the model's face 208. The server 203 may then look up a face effect in buffer storage 203b and combine the face effect with the model's face 209. The model may then perform with the face effect on his or her face 210. Videos with face effect may be transmitted 211 to the user 201 who has started the tip action via the network 203.

Figure 3:
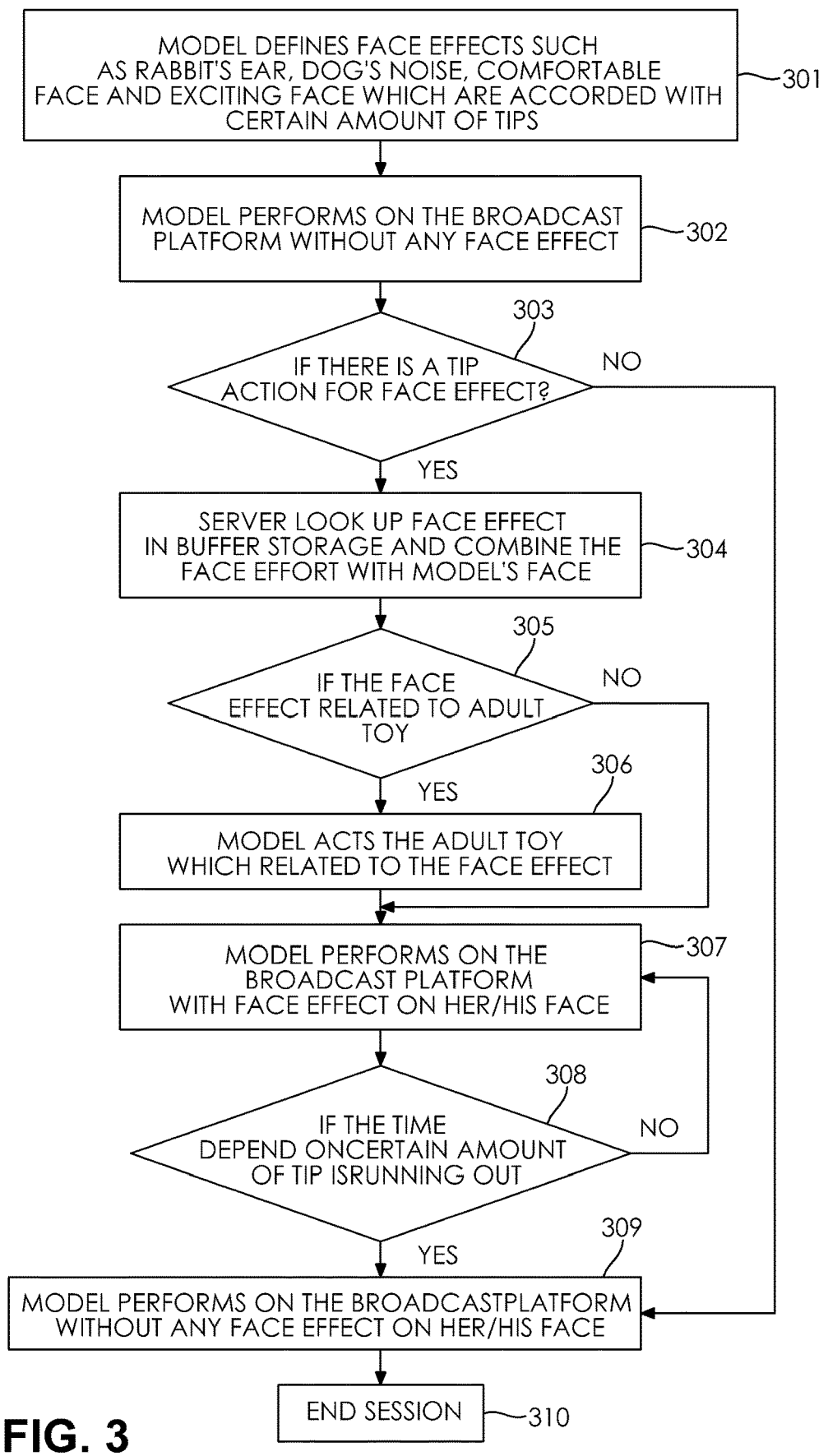
FIG. 3 is an example flow chart of the method for an online broadcast platform that adds face effects into live video.

FIG. 3 is an example flow chart of the method for an online broadcast platform that adds face effects into live video. A model may define face effects, for example rabbit ears, a dog nose, a comfortable face, or an excited face 301. The face effect may be accorded with a certain amount of tips. The model may perform on the broadcast platform without a face effect 302. On a condition that there is a tip action for a face effect 303, the server may look up the face effect in buffer storage and combine the face effect with the model's face 304. On a condition that the face effect is related to an adult toy 305, the model may act with the adult toy related to the face effect 306. The model may then perform on the broadcast platform with the face effect 307. On a condition that the time of the session is not running out 308, the model may continue to perform on the broadcast platform with the face effect 307, until time runs out. Once time is running out 308, the model may perform on the broadcast platform without any face effect 309 and the session may end 310.

On a condition that there is no tip action for a face effect 303, the model may perform on the broadcast platform without any face effect 309 and the session may end 310.

On a condition that the face effect is not related to an adult toy 305, the model may perform on the broadcast platform with the face effect 307. On a condition that the time of the session is not running out 308, the model may continue to perform on the broadcast platform with the face effect 307, until time runs out. Once time is running out 308, the model may perform on the broadcast platform without any face effect 309 and the session may end 310.

Figure 4:
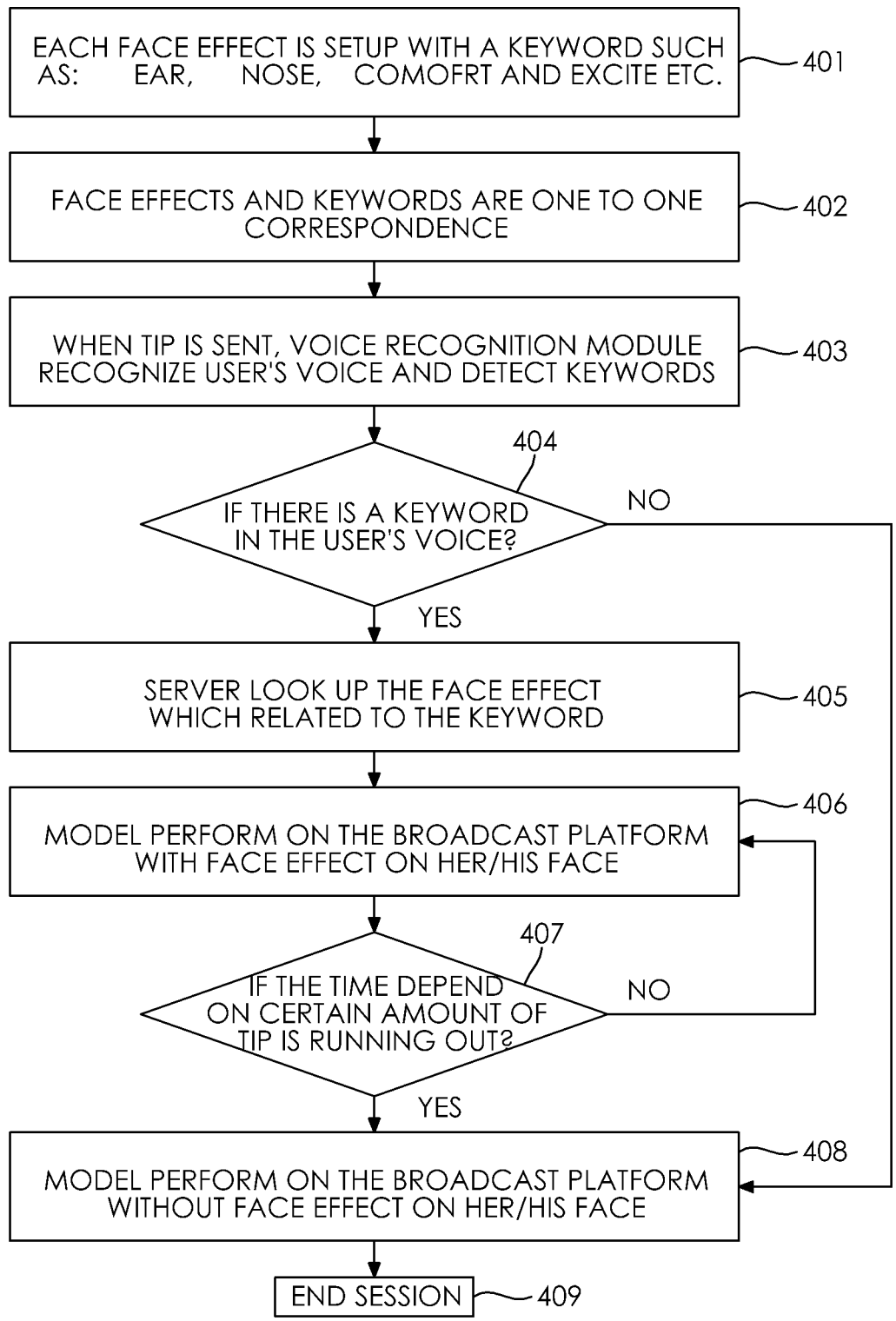
FIG. 4 is an example flow chart for storing and recognizing face effects.

FIG. 4 is an example flow chart for storing and recognizing face effects. Each face effect may be setup with a keyword, for example, ear, nose, comfort, excite, and the like 401. The face effects and keywords may be a one to one correspondence 402. When a tip is transmitted, a voice recognition module may recognize the user's voice and detect keywords 403. On a condition that there is a keyword in the user's voice 404, the server may look up the face effect related to the keyword 405. The model may perform on the broadcast platform with the face effect 406. On a condition that the time of the session is not running out 407, the model may continue to perform on the broadcast platform with the face effect 406 until time runs out. Once time is running out 407, the model may perform on the broadcast platform without any face effect 408 and the session may end 409.

On a condition that there is no keyword in the user's voice 404, the model may perform on the broadcast platform without any face effect 408 and the session may end 409.

FIGS. 5A-M are examples of different face effects.

Figure 5A:
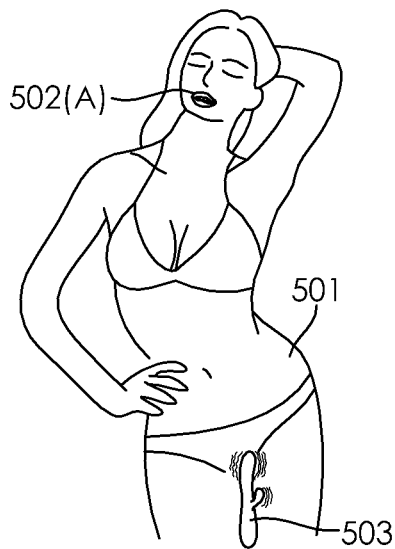
FIGS. 5A-5M are examples of face effects.

FIG. 5A is an example face effect showing a comfortable face. A model 501 may have a comfortable face 502(A) face effect. The comfortable face 502(A) face effect may be associated with an adult toy 503.

Figure 5B:
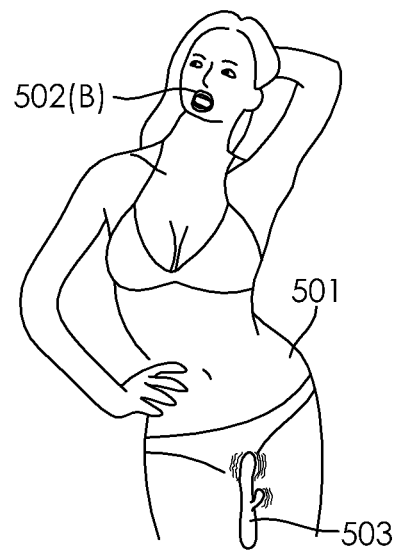

FIG. 5B is an example face effect showing an excited face. A model 501 may have an excited face 502(B) face effect. The excited face 502(B) face effect may be associated with an adult toy 503.

Figure 5C:
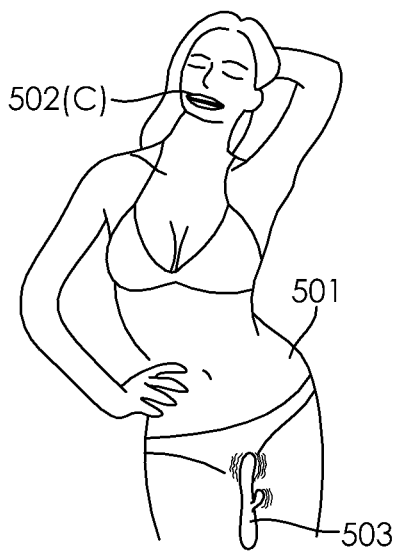

FIG. 5C is an example face effect showing big lips. A model 501 may have a big lips 502(C) face effect. The big lips 502(C) face effect may be associated with an adult toy 503.

Figure 5D:
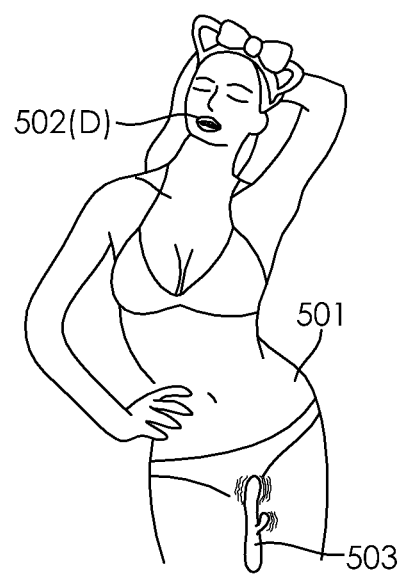

FIG. 5D is an example face effect showing a bow headband. A model 501 may have a bow headband 502(D) face effect. The bow headband 502(D) face effect may be associated with an adult toy 503.

Figure 5E:
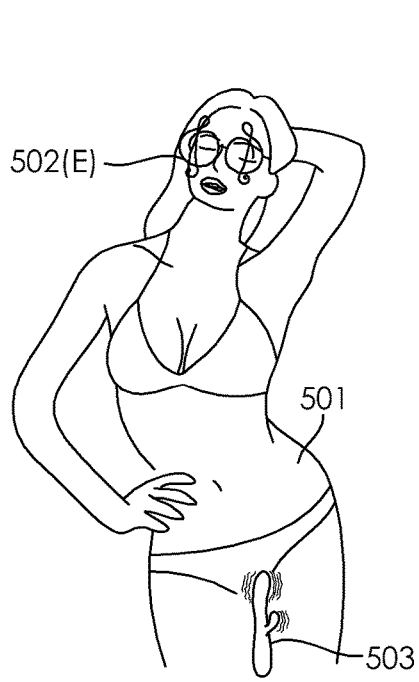

FIG. 5E is an example face effect showing music note glasses. A model 501 may have a music note glasses 502(E) face effect. The music note glasses 502(E) face effect may be associated with an adult toy 503.

Figure 5F:
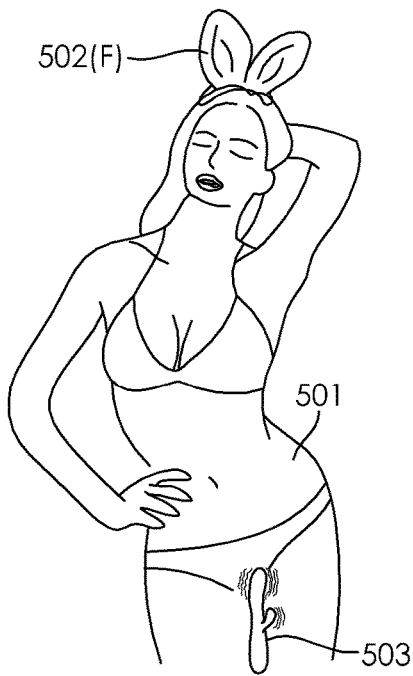

FIG. 5F is an example face effect showing rabbit ears. A model 501 may have a rabbit ears 502(F) face effect. The rabbit ears 502(F) face effect may be associated with an adult toy 503.

Figure 5G:

FIG. 5G is an example face effect showing a dog nose. A model 501 may have a dog nose 502(G) face effect. The dog nose 502(G) face effect may be associated with an adult toy 503.

Figure 5H:
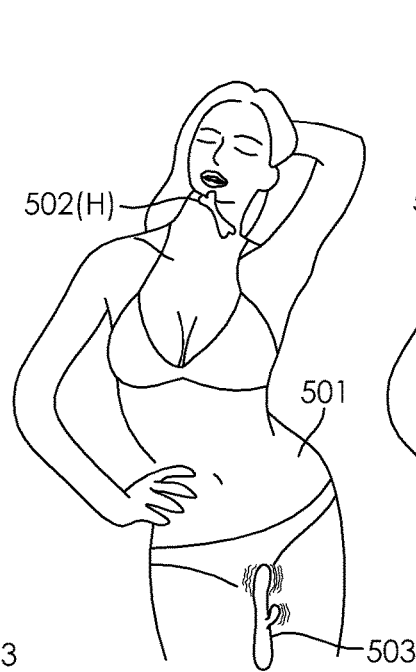

FIG. 5H is an example face effect showing a dog bone. A model 501 may have a dog bone 502(H) face effect. The dog bone 502(H) face effect may be associated with an adult toy 503.

Figure 5I:
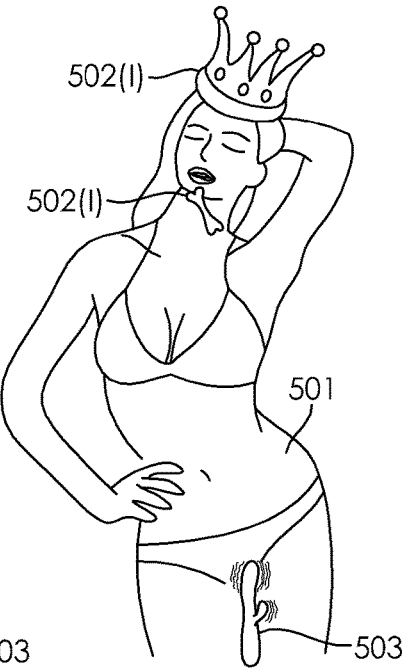

FIG. 5I is an example face effect showing a crown and a dog bone. A model 501 may have a crown and dog bone 502(I) face effect. The crown and dog bone 502(I) face effect may be associated with an adult toy 503.

Figure 5J:
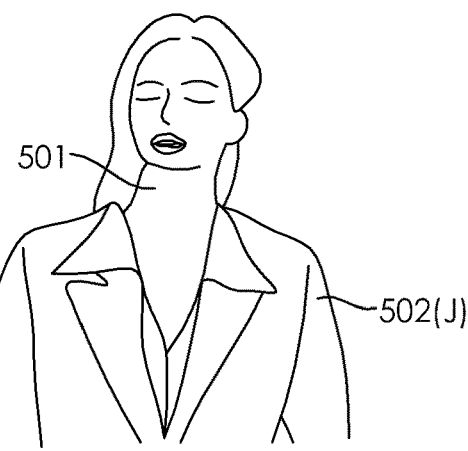

FIG. 5J is an example face effect showing a shirt and jacket. A model 501 may have a shirt and jacket 502(J) face effect.

Figure 5K:
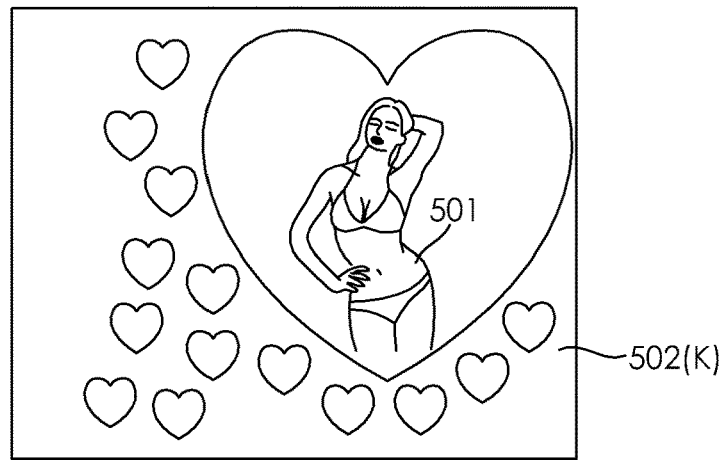

FIG. 5K is an example face effect showing a first example of a heart frame. In this example face effect, the heart frame 502(K) may frame the model 501 and include multiple mini hearts surrounding model face.

Figure 5L:
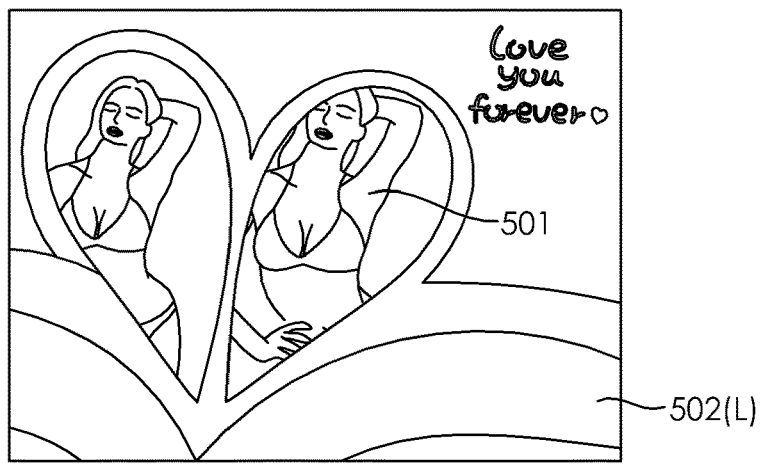

FIG. 5L is an example face effect showing a second example heart frame. In this example face effect, the heart frame 502(L) may frame the model 501 and include words. The model 501 may be doubled on two halves of the heart and the words may read "love you forever."

Figure 5M:
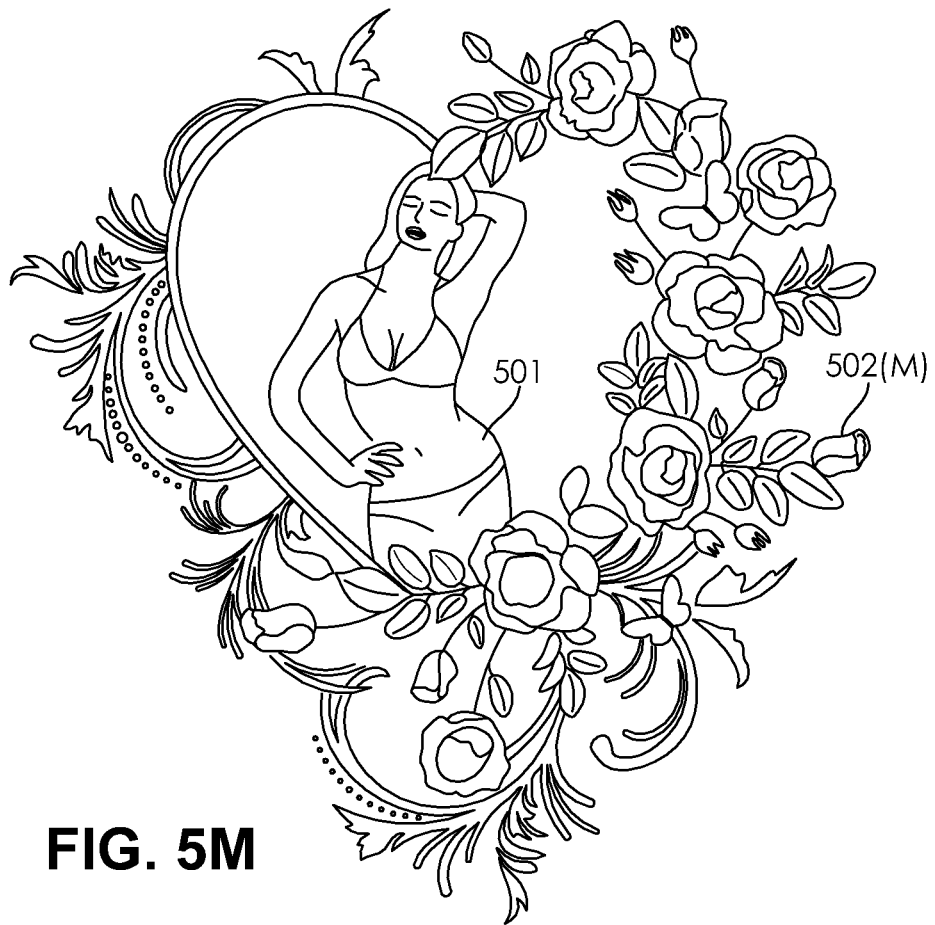

FIG. 5M is an example face effect showing a third example heart frame. In this example face effect, the heart frame 502(M) may frame the model 501 and have flowers. The flowers may be in the shape of the heart itself.

Figure 6A:
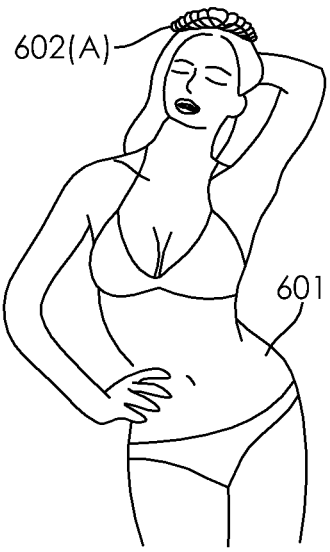
FIGS. 6A and 6B are examples of face effects with text.

FIG. 6A is a first example of a face effect with text. In this example, the face effect shows a crown 602(A) on the model 601. The text may provide words relating to the client themselves. In this example, the text states "Tom is kind and strong."

Figure 6B:
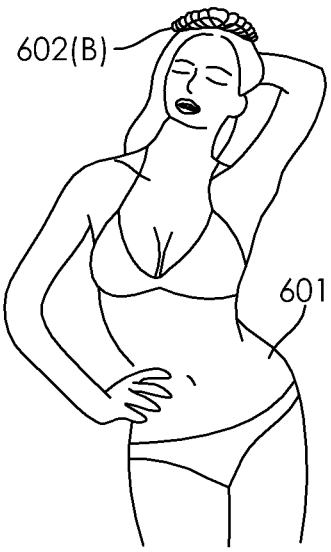

FIG. 6B is a second example of a face effect with text. In this example, the face effect shows a crown 602(B) on the model 601. In this example, the text states "Tips from Tom make me excited."

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed:

1. A system that adds an effect image to a live video of a model, the system comprising:
    a device wirelessly connected to at least one adult toy, wherein the device includes a processor to actuate the at least one adult toy;
    a buffer storage, wherein the buffer storage stores at least one effect image; and
    an image recognition module that identifies features of the adult toy;
    wherein the processor includes an installed software application; and
    wherein the buffer storage, the image recognition module that identifies features of the adult toy, the processor that actuates the at least one adult toy, and the installed software application are configured to
        receive a tip from a user to activate a face effect image selected from a plurality of face effect images;
        recognize an image of the model's body;
        select and retrieve the face effect image from the plurality of face effect images based on an amount of the tip received;
        combine the retrieved face effect image with the image of the model's body; and
        broadcast the live video to the user with the retrieved face effect image on the model's body;
    wherein:
        the amount of the tip is defined by the model via a model device; and
        a tip amount is defined by the model for each of the plurality of face effect images.

2. The system of claim 1, wherein the at least one adult toy is Wi-Fi enabled.

3. The system of claim 1, wherein the at least one adult toy is Bluetooth enabled.

4. The system of claim 1, wherein the software application includes a link generator for generating live control links, each of which is linked to at least one face effect image.

5. The system of claim 4, wherein the live control link includes a unique Uniform Resource Locator (URL) related to a certain kind of face effect image.

6. The system of claim 4, wherein the link generator builds a queue of multiple links.

7. The system of claim 1, wherein at least one face effect image is related to the at least one adult toy.

8. The system of claim 1 wherein at least one face effect image is any one of a dog nose, rabbit ears, a comfortable face, or an excited face.

9. The system of claim 1, wherein retrieving the face effect image includes looking up the face effect image from a plurality of face effect images stored in the buffer storage.

10. The system of claim 9, wherein the model defines the plurality of face effect images.

11. A method that adds an effect image to a live video of a model, the method comprising:
    receiving a tip from a user to activate a face effect image selected from a plurality of face effect images;
    recognizing an image of the model's body;
    selecting and retrieving the face effect image from the plurality of face effect images based on an amount of the tip received;
    combining the retrieved face effect image with the image of the model's body; and
    broadcasting the live video to the user with the retrieved face effect image on the model's body;
    wherein:
        defining the amount of the tip using a user device of the model; and
        defining a tip amount using the user device of the model for each of the plurality of face effect images.

12. The method of claim 11, wherein the face effect image is related to an adult toy.

13. The method of claim 11, further comprising:

broadcasting the video without the face effect image on the condition that a tip has not been received.

14. The method of claim 11, wherein the face effect image is associated with a key word.

15. The method of claim 11, wherein the face effect image is any one of a dog nose, rabbit ears, a comfortable face, or an excited face.

16. A system that adds an effect image to a live video of a model, the system comprising:
- a device wirelessly connected to at least one adult toy, wherein the device includes a processor to actuate the at least one adult toy;
- a buffer storage, wherein the buffer storage stores at least one effect image; and
- an image recognition module;
- wherein the processor includes an installed software application;
- wherein the buffer storage, the image recognition module, and the installed software application are configured to
   - receive a tip from a user to activate a face effect image selected from a plurality of face effect images;
   - recognize an image of the model's body including the model's face;
   - select and retrieve the face effect image from the plurality of face effect images based on an amount of the tip received;
   - wherein:
      - defining the amount of the tip using a user device of the model; and
      - defining a tip amount using the user device of the model for each of the plurality of face effect images;
   - combine the retrieved face effect image with the model's face on the image of the model's body; and
   - broadcast the live video to the user with the retrieved face effect image on the model's face; and
- wherein the face effect image is selected from the group of an excited face, big lips, a bow headband, music note glasses, rabbit ears, dog nose, and combinations thereof.

17. The system of claim 16, wherein:
the face effect image is related to the at least one adult toy; and
the model performs on the live video using the at least one adult toy with the retrieved face effect image on the model's face on the image of the model's body.

* * * * *